United States Patent [19]
Boergardts et al.

[11] Patent Number: 5,746,920
[45] Date of Patent: May 5, 1998

[54] PROCESS FOR PURIFYING DAIRY WASTEWATER

[75] Inventors: Peter Boergardts, Stuttgart; Wolfgang Krischke, Kirchentellinsfurt; Walter Troesch, Stuttgart, all of Germany

[73] Assignee: Fraunhofer-Gesellschaft zur Foerder der Angewandten Forschung e.V., Munich, Germany

[21] Appl. No.: 598,324

[22] Filed: Feb. 8, 1996

[30] Foreign Application Priority Data

Jun. 8, 1994 [DE] Germany .................. 44 20 033.1
Jun. 2, 1995 [WO] WIPO ............... PCT/DE95/00722

[51] Int. Cl.[6] ........................... C02F 3/34; C02F 1/46
[52] U.S. Cl. ................. 210/611; 210/631; 210/638; 210/903; 204/537; 204/540; 204/542; 204/543
[58] Field of Search .................. 210/607, 610, 210/611, 630, 631, 638, 639, 645, 903; 204/523, 527, 530, 531, 537, 540–544

[56] References Cited

U.S. PATENT DOCUMENTS

| | | | |
|---|---|---|---|
| 4,110,175 | 8/1978 | Ahlgren et al. | 204/180 P |
| 4,138,501 | 2/1979 | Chaveron | 210/638 |
| 4,351,710 | 9/1982 | Jain | 204/540 |
| 4,781,809 | 11/1988 | Falcone, Jr. | 204/182.4 |
| 4,855,056 | 8/1989 | Harju et al. | 210/638 |
| 4,971,701 | 11/1990 | Harju et al. | 210/638 |
| 5,002,881 | 3/1991 | Van Nispen et al. | 435/139 |
| 5,464,514 | 11/1995 | Pluim et al. | 204/530 |
| 5,522,995 | 6/1996 | Cockrem | 210/637 |
| 5,575,916 | 11/1996 | Brian et al. | 210/634 |
| 5,616,249 | 4/1997 | Hodgdon | 210/651 |

FOREIGN PATENT DOCUMENTS

| | | |
|---|---|---|
| 0 055 382 | 7/1982 | European Pat. Off. |
| 0 072 010 | 2/1983 | European Pat. Off. |
| 0 230 021 | 7/1987 | European Pat. Off. |
| 0 265 409 | 4/1988 | European Pat. Off. |
| 0 338 162 | 10/1989 | European Pat. Off. |
| 0 346 983 | 12/1989 | European Pat. Off. |
| 0 393 818 | 10/1990 | European Pat. Off. |
| 2 555 200 | 5/1985 | France |
| 2 674 865 | 10/1992 | France |
| 2 686 897 | 8/1993 | France |
| 38 12 440 | 10/1989 | Germany |
| 42 11 267 | 10/1993 | Germany |
| 89 01510 | 2/1989 | WIPO |

OTHER PUBLICATIONS

Temper et al., "Berichte aus Wassergutewirtschaft und Gesundheitsingenieurwesen", Technische Universitat Munchen, (1986) pp. 403–465.

Rehmann et al., Chem. –Ing. –Tech. 64 (1992), Nr. 3, pp. 286–288.

*Primary Examiner*—Thomas G. Wyse
*Attorney, Agent, or Firm*—Foley & Lardner

[57] ABSTRACT

A process and apparatus for purifying lactose-containing wastewater. The process comprises first treating the wastewater with base. The treated wastewater is then introduced into a fermenter where the lactose present in the wastewater is fermented to form a fermentation broth and lactic acid. The broth is advantageously subjected to purification and the purified broth is subjected to bipolar electrodialysis to yield concentrated lactic acid and base solutions from the purified broth. A device is provided for carrying out the process.

18 Claims, 7 Drawing Sheets

PROCESS FOR PURIFYING DAIRY WASTEWATER

FIELD OF THE INVENTION

The present invention relates to a process for purifying dairy wastewater by anaerobic metabolism and separation of the reaction products formed and an apparatus for carrying out this process.

BACKGROUND OF THE INVENTION

In conventional wastewater purification processes, degradable constituents are degraded either anaerobically to form methane and $CO_2$, or aerobically to form $CO_2$, water and biomass. In these processes, a considerable part of the energy contained in the wastewater constituents is lost. In fact, in the case of aerobic degradation, substantially all of the energy is lost. In an aerobic process, in addition to a high biomass formation, considerable amounts of sludge occur. The principal disadvantage of known anaerobic wastewater treatment processes is the slow reaction rates which are required for mass conversion (max. 1 g/lh chemical oxygen demand (COD) degradation). The anaerobic treatment of dairy wastewaters is surveyed by Temper et al. in "Berichte aus Wassergutewirtschaft und Gesundheitsingenieurwesen", [Water Industry and Health Engineering Reports], Technical University, Munich, 1986, No. 67.

SUMMARY OF THE INVENTION

It is therefore an object of the present invention to provide a means for obtaining a wastewater having a low diluate concentration or COD load, and wherein lactic acid is also isolated so that the final product can be used in the food industry, in agriculture or in the chemical industry.

It is an also an object of the present invention to provide a process for purifying wastewaters obtained from milk-processing enterprises, so that a major part of the energy contained in the starting substances is retained.

It is yet a further object to provide an apparatus for purifying wastewaters obtained from milk-producing enterprises.

In accordance with these objectives there is provided a process for purifying wastewater comprising treating the wastewater with base, introducing the treated wastewater into a fermenter, anaerobically fermenting the lactose present in the wastewater to form a fermentation broth and lactic acid, subjecting the fermentation broth formed in the fermenter to a secondary purification, reducing the concentration of any lactate in the wastewater, and concentrating lactic acid and base using bipolar electrodialysis.

In further accordance with these objectives, there is also provided an apparatus comprising at least one reservoir vessel, a first alkali solution vessel, a fermenter, and an electrodialysis unit. The electrodialysis unit has one or more electrodialysis stacks having bipolar membranes and has at least one lactic acid collection vessel, at least one alkali solution collection vessel, and at least one diluate collection vessel. The diluate collection vessel is adapted to contain diluate which is to be passed to the electrodialysis unit. The alkali solution collection vessel of the electrodialysis unit is connected to the first alkali solution vessel for recycling at least a portion of any alkali solution produced in the electrodialysis unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

The present invention relates to treatment processes for wastewaters, and in particular, whey-containing wastewaters, in which the principal carbon source is not converted to methane, $CO_2$ and water, but to organic acid, i.e., lactic acid. The production of lactic acid from whey has been described, for example, in EP0265409 A1 and FR2555200. However, the purpose of such known processes is generally the inexpensive production of a product from whey-based substrates. Such known processes therefore, differ in fundamental ways from the subject inventions.

The process according to one embodiment of the comprises three stages: in the first stage, the wastewater is pretreated with base. In the second stage, the pretreated wastewater is introduced into a fermenter, where the lactose present is fermented to lactic acid, and the fermentation broth formed is given a secondary purification. In the third stage, the lactic acid concentration in the wastewater is reduced and lactate ions and base are concentrated using bipolar electrodialysis.

The term "lactic acid" is used here in the broad sense and includes all chemical forms of lactate (i.e., the acid itself, its salts or the lactate anions) as a function of the respectively chosen or prevailing conditions, in particular the pH.

The term "COD" as used herein means chemical oxygen demand.

Any wastewaters which contain milk or whey residues can be treated using the process according to the invention. Dairy wastewaters are particularly envisioned as being treatable with the process and/or apparatus of the present invention. Most preferably, the permeate produced in the ultrafiltration of whey-containing wastewaters is treated.

The wastewater is treated in the first stage with base, preferably with aqueous base. Bases which are suitable include, for example, alkali metal hydroxides, alkali metal carbonates and/or ammonium compounds. Most preferably, the base used is an alkaline solution which is produced in a later stage of this process in the concentration of the filtrates. By using the alkaline solution which is formed as part of the same process, the addition of external chemicals (which would possibly further increase the COD load of the wastewater) can be avoided to a large extent or even entirely.

Figure 2:
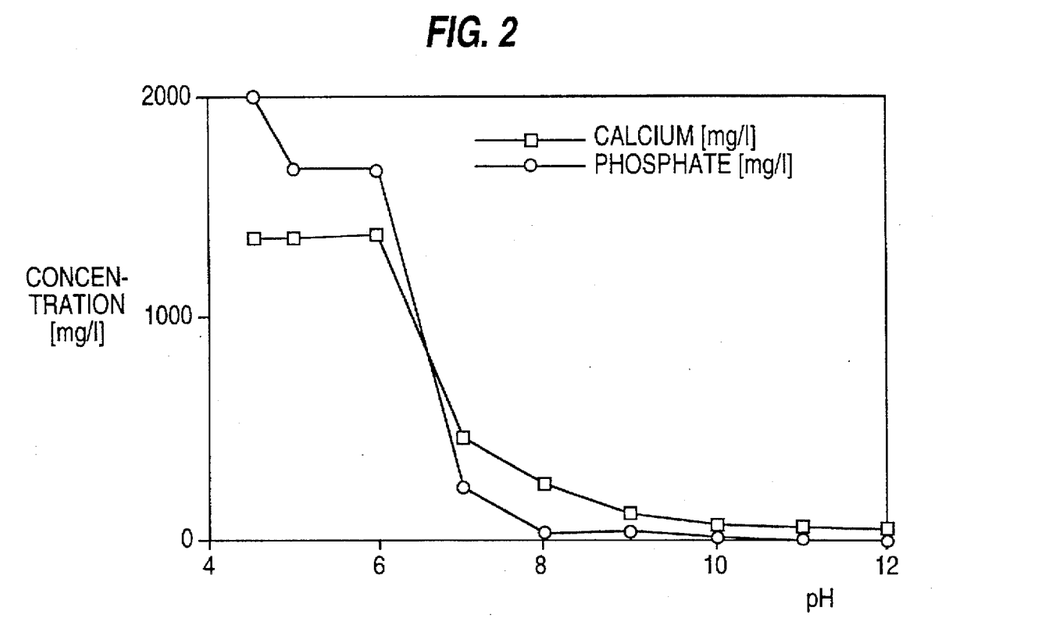
FIG. 2 shows the concentration of dissolved calcium ions and phosphate ions (in mg/l in each case) as a function of the pH established during the pretreatment.

The amount of base fed should be sufficient to precipitate out a portion, and to the extent possible, the majority, of the $Ca^{2+}$ and $Mg^{2+}$ ions and $PO_4^{3-}$ ions present in the wastewater (see FIG. 2). It is preferred that the pH of the wastewater is adjusted to $\geq 7$. In one embodiment of the process, the wastewater is adjusted to a pH of $\geq 10$ and is charged into a reservoir vessel in which any calcium phosphate precipitating out is sedimented. Obviously, the calcium phosphate also can be separated off by centrifugation or filtration, in a hydrocyclone or by any other comparable measures.

In one specific embodiment, the above described base treatment is carried out in at least one buffer tank (reservoir vessel). The buffer tank preferably is equipped with a stirrer and a heater. It is desirable that the reservoir vessel be capable of sterilization and that the vessel also is equipped with a pH controller or with a pH meter. The reservoir vessel should have an opening in the bottom of the vessel for take-off of calcium hydrogen phosphate precipitated out and other possible precipitates. In the event that the permeate from ultrafiltration for sterile filtration and for protein isolation is being treated, it is preferable to have a limit of 15,000 to 30,000 daltons so that sterile take-off and feed to the buffer tank are easier to accomplish.

The vessel may also have one or more additional take-offs which are adjustable in height and serve to remove permeate. Two or more of such buffer tanks (reservoir vessels) can be operated alternately. In this way, one buffer tank could serve each time for charging the fermenter. The other tank can be filled, brought to an appropriate pH and the calcium hydrogen phosphate and any other possible precipitates or phases may be separated off.

Figure 3:
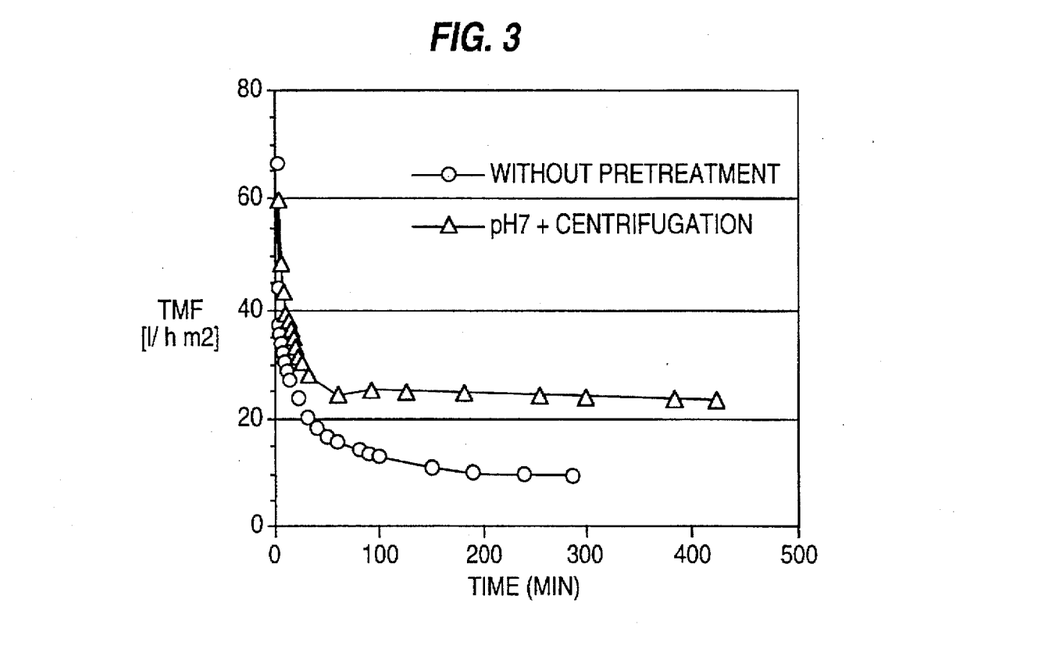
FIG. 3 shows the transmembrane flux during the filtration of a whey permeate fermented by $L.$ $casei$ as a function of time, with or without pretreatment with base (microfiltration membrane Carbosep M20, manufacturer: Rhône-Poulenc, 0.2 mm nominal pore diameter, 1 bar, 1 m/s).

Advantages of pretreating the wastewater with base are the marked decrease of the phosphate load in the wastewater and the avoidance of fouling and scaling problems in those downstream process steps which require the use of membranes (e.g., microfiltration (see FIG. 3) or electrodialysis), and the reduction of the sterility problems in the buffer vessel. Furthermore, no undesirable precipitations occur during fermentation, since substantially only soluble lactic acid salts are formed.

The wastewater pretreated as described above is then, in the second stage of the process, fed to a fermentation reactor (fermenter). It is desirable that a pH which is optimum or at least favorable for the fermentation organisms is established and maintained in the fermenter, for example a pH range from 6.0 to 6.5. Establishing and maintaining a favorable pH in the fermenter can be performed in a plurality of ways. For example, as is known to those skilled in the art, the pH in the fermenter can be regulated by addition of base to the fermenter itself. However, in an advantageous embodiment of this invention, the pH in the fermenter is adjusted via regulation of the volume flowing into the fermenter of the wastewater which has been made alkaline via the above pretreatment. This regulation of flow can be performed using a pH stat which measures the pH in the fermenter and regulates the addition of the wastewater automatically in such a way that the lactic acid produced in the fermenter is neutralized and the pH is maintained at a desired value such as the previously described value. This achieves an automatic setting to a desired material conversion rate and thus an essentially constant product concentration. The reactor should, in addition, preferably have a level controller in order to ensure a constant level.

In the event of a decrease of the microbial conversion rate, for example, due to operating faults or contaminations, the feed rate is automatically decreased, but the product concentration remains the same. If the biological activity in the fermenter increases again, the inflowing rate is automatically increased again. If the lactose content in the feed is known, this embodiment of the invention enables the fermentation to be operated automatically at substantially complete conversion. Moreover, the use of pH-statting has the advantage that, upon further work-up of the lactic acid, a constant product feed concentration results and, due to the complete conversion in the fermenter, colonization (i.e., build-up) in downstream filtration and electrodialysis membranes is prevented, and the maximum achievable COD reduction in the wastewater can be achieved. Also, by preventing build-up, there also will be an improvement in transmembrane filtrate fluxes.

In the fermenter, the lactose present in the wastewater and any other sugars are converted homofermentatively to lactic acid using lactic acid bacteria. Lactic acid bacteria utilize only a very small spectrum of the metabolic pathways present in nature for the degradation of nutrients: they convert certain sugars such as lactose to lactic acid anaerobically and produce from this reaction energy for growth and maintenance of cell function. Degradation of the sugar and growth of the organisms are substantially coupled to one another and generally take place simultaneously.

The choice of the strain or strains for the novel process is optional, but the lactic acid bacteria are preferably organisms from the genera Lactobacillus, Lactococcus and Streptococcus.

The growth of the lactic acid bacteria is to a great extent dependent on the presence of certain additives. These are, in particular, vitamins, trace elements and nitrogen in organic form, i.e., in the form of (hydrolyzed) proteins, peptides and amino acids. The known processes for lactic acid production from whey permeate describe the necessity of such an addition of external nitrogen sources such as yeast extracts, corn steep liquor and the like (see EP 0 265 409 A1 and 0 393 818 A1). In a preferred embodiment of the invention, in the conversion of lactose to lactic acid, the addition of such additives and, in particular the addition of an organic nitrogen source for the lactic acid bacteria, can be dispensed with entirely or for the most part.

Figure 4:
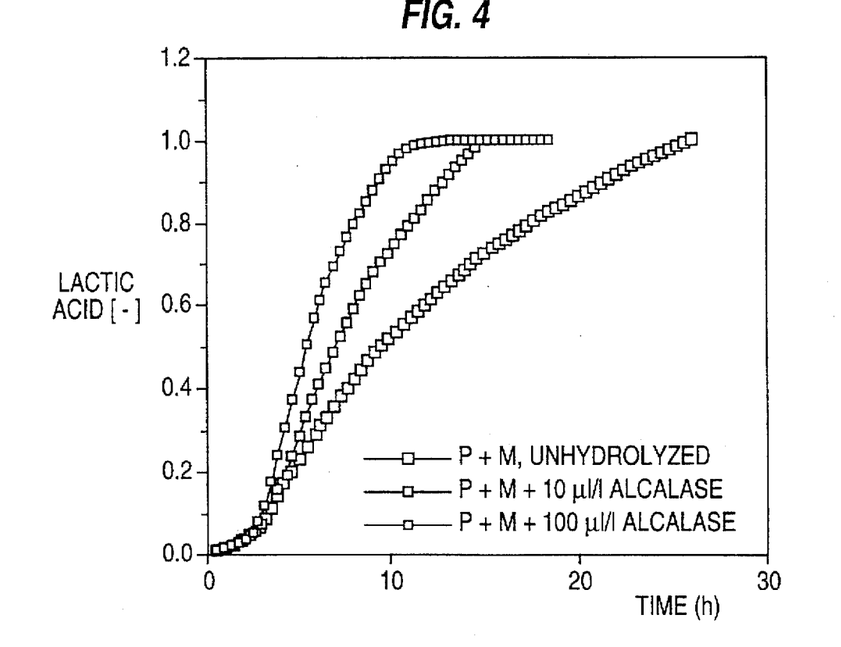
FIG. 4 shows the formation of lactic acid from whey permeate (P) with unhydrolyzed whey protein (M) and whey protein (M) hydrolyzed in the reactor by Alcalase.

Thus, according to one embodiment, the addition of nitrogen-containing compounds can be omitted entirely or for the most part if the nitrogen-containing substances present in the wastewater (including those which cannot be naturally metabolized by lactic acid, or those which can only be slowly metabolized by lactic acid bacteria) are converted during the fermentation, or even in advance, to compounds which can be relatively rapidly utilized by the organisms. For example, proteins can be hydrolyzed, e.g., by addition of enzymes such as proteases which are optionally introduced directly into the fermenter or can be fed in a previous process stage. Proteases which are suitable include those which are active at the fermentation conditions present, for example, HT Proteolytic 200 (Solvay), Neutrase and Alcalase (Novo Nordisk) (see FIG. 4). Alternatively, the nitrogen source can also be produced by acid hydrolysis or any other method known to those skilled in the art.

The temperature in the fermenter will depend on the microorganisms which are employed. That is, because the temperature requirements among microorganisms can vary, the nature of the particular microorganism(s) employed should be considered when selecting the temperature of the fermenter. The temperature can be, for example, 30°–45° C.

Figure 5:
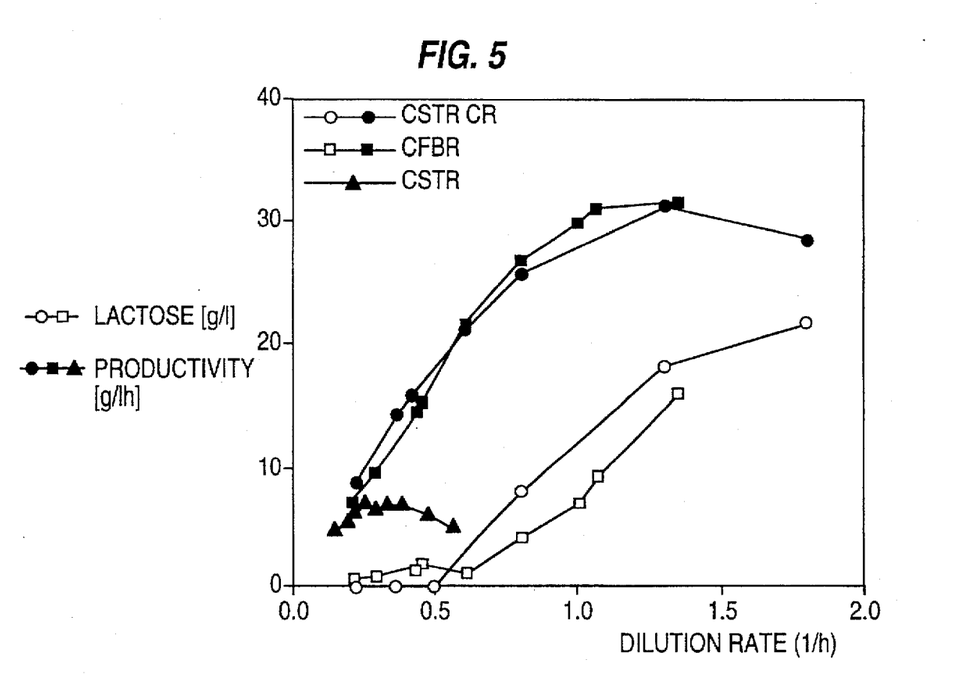
FIG. 5 shows the productivities of the various reactor systems at various lactose concentrations.

The fermentation itself can be carried out in any fermentation reactor, for example in a fluidized-bed reactor, in which the microorganisms are immobilized on porous sintered glass or other supports which are inert as far as possible, or in a stirred-tank reactor. The reactor is preferably made of stainless steel. In order to achieve high productivity rates, it is advisable to equip the stirred-tank reactor with a cell retention system. The use of a cell retention system can lead to significantly higher productivities (see FIG. 5). For example, when employing a cell retention system, the COD conversion rate can be up to 20 times more rapid in comparison with the known anaerobic wastewater treatment processes. For the cell recycling, a part-stream is taken from the fermenter and circulated via a cell removal stage. The cells can be removed by membrane processes or by centrifugation. If a fluidized-bed reactor is employed, a stream can be taken off at the top of the reactor and introduced below centrally into the reactor in order to fluidize the fluidized bed. A further stream can be removed in order to keep the reactor volume constant.

Membrane processes are preferred for the cell removal. A cell-free permeate stream is taken off from a cell removal module. In addition, a bleed stream may be provided which bears cell-containing fermentation broth and can be taken off directly downstream of the filtration unit or directly from the fermenter. By varying the ratio of bleed stream to permeate stream the desired degree of concentration can be set. This so-called recycle ratio is defined in this case as $$R = \frac{\text{Permeate stream}}{\text{Permeate stream} + \text{bleed stream}}.$$

If the fermenter balance equation for the biomass is considered, the great effect of the recycle ratio R on the system becomes evident. The differential equation below is obtained:

$$V_R \frac{dx}{dt} = V_R(\mu - k_d)x - D V_R(1 - R)x$$

x biomass (g/l)
$V_R$ reactor volume (l)
$k_d$ death rate (1/h)
D throughflow rate (1/h)
$\mu$ growth rate (1/h)
t time With increasing recycle ratio, the biomass concentration in the system increases and at the same throughflow rates, many times the amount of submerged biomass is obtained. Since the lactose conversion rate is generally proportional to the biomass itself and to the biomass growth, at higher biomass concentrations, there is higher substrate consumption per unit of reactor volume, i.e., enhanced conversion rate and thus an improved product formation rate. On the other hand, it may be undesirable to operate the reactor with complete cell retention, since in such a case, the changes in the cultures due to the corresponding selection pressure may result in shifts in the product spectrum. Moreover, undesirable substances which pass into the reactor via the cell medium accumulate to a very great extent. This accumulation has unfavorable effects on the biological and technological system.

Figure 6:
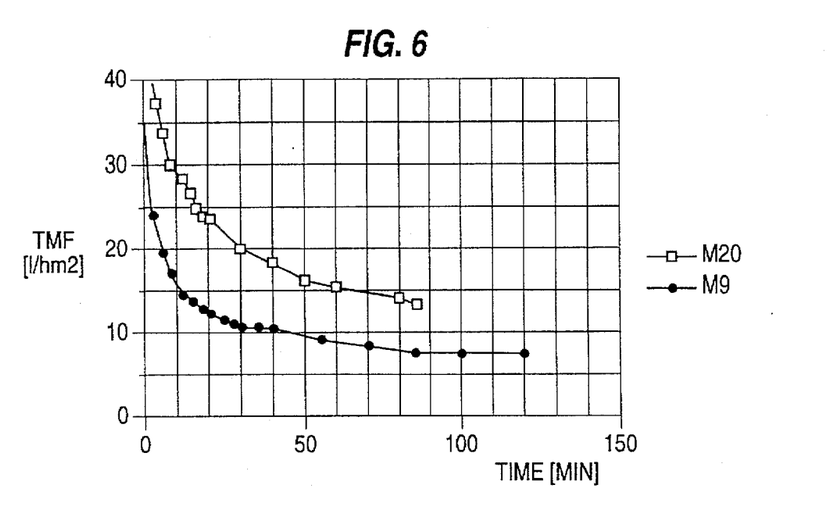
FIG. 6 shows a comparison between ultrafiltration and microfiltration in the filtration of $L.$ $casei$ from whey fermentation solution, (1 bar, 1 m/s) Carbosep M20 (0.2 mm) and Carbosep M9 (300,000 Daltons) (manufacturer: Rhône-Poulenc).

The cell retention system is preferably fed by the circulating stream from the fermenter. The cell retention system may be operated by ultrafiltration membranes. However, microfiltration membranes are preferably used, since, because of the controlled-coating process, complete removal of all components can also be achieved by these membranes. But, at the same time, at the same energy input, higher transmembrane fluxes are achieved, which can decrease the membrane area required (see FIG. 6). Moreover, the use of microfiltration membranes enables lower pressures to be employed. Ceramic multichannel tube modules having a pore diameter of about 0.2 μm which are arranged in stainless steel housings are preferably used. However, other modules, membrane materials and pore diameters are also possible.

The tubing should preferably be made of stainless steel. The filtration unit is also optionally equipped with an apparatus for external back-flushing of the modules. The back-flushing can be performed by a permeate-side pressure pulse, which can be produced by sterile-filtered compressed air on an intermediate vessel. Upstream and downstream of the filtration modules, pressure sensors and volumetric flow meters are preferably mounted.

The filtration unit can be planned to have multiple lines and, most preferably, two lines are employed. Multiple lines may be used enabling one module to be cleaned as required without interrupting the filtration operation. The system preferably has the capacity for cleaning in place (CIP). That is, it is not required that the apparatus be removed for cleaning or any other type of servicing. The bleed stream can be set by a ratio flow controller at a defined ratio to the permeate stream from the filtration unit. The permeate is preferably continuously fed to the electrodialysis (see below). Most preferably, the permeate is fed directly via a nanofiltration unit or via a selective ion exchanger.

The ion exchanger may be used to free the cell-free fermentation broth from any calcium residues still present. The weakly acidic macroreticular cation exchanger resins Duolite XE 702 or Duolite C 467 from Rohm & Haas, Paris, for example, are highly suitable. Owing to their specific reactive groups, these ion exchangers preferentially bind divalent ions, such as calcium and magnesium, while permitting to the greatest extent possible, the passage of the monovalent ions which do not interfere during the third process stage of wastewater purification and lactic acid isolation. When an ion exchanger is used, the calcium concentration of the fermentation broth may be very greatly decreased, for example to below 5 ppm. Since electrodialysis membranes (described below) which are used during a later processing stage are generally sensitive to the precipitation of $Ca(OH)_2$ in the basic concentrate, a low calcium concentration gives the advantage that the membranes used have a substantially longer service life.

The ion-exchange resin may be situated in one, but preferably in two (or more), ion-exchange columns, through which the permeate stream from the filtration flows continuously in alternation. Downstream of the exchange column should be situated a measurement instrument for measuring the loading of the exchanger. If one exchanger is laden, flow can automatically be switched to the second or another column, so that a continuous stream is fed to the electrodialysis. The ion exchangers may be regenerated by acid and alkali solutions which, after the ion-exchange material becomes laden, can be passed through the respective exchanger column(s) not in operation.

Alternatively or additionally to the use of an ion exchanger, a nanofiltration unit can be used. The nanofiltration unit preferably comprises a high-pressure pump and filtration modules which are equipped with nanofiltration membranes. Suitable nanofiltration membranes include those which are capable of retaining calcium and lactose but essentially allow the passage of lactic acid. As an example, the Filmtec membrane XP 45 (Dow Chemical) which has a retention rate of up to 99% for lactose and calcium, whereas lactate is only retained at 30%, is contemplated as being useful. If the wastewater, for example, after being subject to the pretreatment in the reactor still has a concentration of 1.15 g/l of calcium, the calcium concentration can be decreased to 40 ppm. Preferably, pressures between 5 and 20 bar are established. The nanofiltration retentate is preferably recycled to the fermenter. A further advantage of employing a nanofiltration process is that substantially any lactose which cannot pass through the nanofiltration membrane, is recycled back to the fermenter together with the retentate stream. Thus, even with incomplete conversion in the fermenter, the wastewater will not be polluted. Alternatively, the retentate may be concentrated and correspondingly continuously removed. The permeate, in this case, is preferably fed to the electrodialysis unit.

In a special embodiment of the present invention, the nanofiltration process step directly follows the lactose fermentation process step. That is, the liquid leaving the reactor is not conducted through a microfiltration unit or any other similar unit used in the art. In this embodiment, the liquid is not even passed through an ion exchanger because cells, lactose and calcium are substantially retained by the nanofiltration unit. The liquid leaving the reactor is subjected to only a single process step, that is to nano filtration, to produce a permeate which in its composition is an ideal product for further processing. This embodiment is particularly advisable if pressure-insensitive organisms are used in the fermentation.

Both the first and the second stage of the novel process, that is, the pretreatment and the fermentation with secondary purification of the fermentation broth, can be carried out discontinuously. Preferably, however, these two stages are operated continuously.

The third stage of the novel process reduces the concentration of lactic acid in the wastewater and thus produces a wastewater having only a very low COD load. The third stage is performed by electrodialysis using bipolar membranes. The use of electrodialysis with bipolar membranes also permits isolation free acid in high concentration and purity directly from the fermentation solution. As a third product in this case, alkali solution is formed which preferably serves to elevate the pH during pretreatment of the wastewater, as described above. Alternately, the alkali solution formed can be used, for example, to regulate the pH of the fermenter.

Membranes for bipolar electrodialysis are generally known. In the simplest case, they may be composed of laminates of two ion-selective drop membranes of opposite polarity. The overall potential drop across the membrane is made up of the individual resistances of the membranes and the resistance of the solution between the membranes. From this, it follows that the thickness of the intermediate space between the membranes is desirably as small as possible. Therefore, in the present process, those membranes which are preferable include those disclosed, for example, in German Offenlegungsschrift 4211267 A1. It is therefore useful to employ multiple-layer membranes having an anion-selective and a cation-selective layer which were produced by generating a first ion-selective layer from a first polymer solution in the presence of an amount of steam such that, on the one hand, condensation of the water is avoided and, on the other hand, the miscibility gap in the polymer/solvent/water phase diagram is achieved. After removing the solvent on the side of the first ion-selective layer which had been exposed to the steam, a second ion-selective layer with opposite charge is generated. Using this process, bipolar membranes can be produced in which the thickness of the charge-neutral intermediate layer between the anion- and the cation-selective layers is very small. The preferred membranes, despite the very low resistance, have chemical properties and a perm selectivity which are comparable to those of other membranes.

Figure 7:
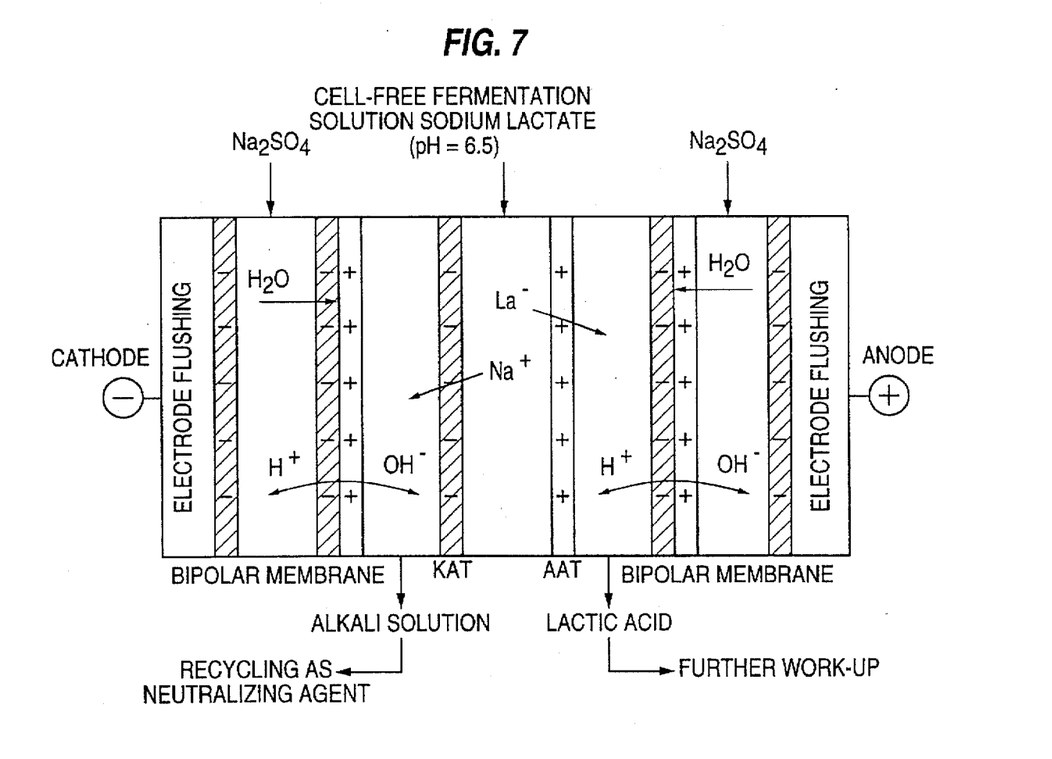
FIG. 7 shows a possible configuration of the bipolar membranes in the third stage of the process according to the invention.

The use of bipolar electrodialysis for purifying lactic acid is generally known (see EP 0393818 A1 and 0346983 A2). A possible configuration of the bipolar membranes in the present inventive process is depicted in FIG. 7, wherein fermentation solution filtrate circulates in the diluate circuit. In accordance with their charge, the lactate anions migrate into the acidic circuit and the sodium ions migrate into the basic circuit. The pH in each of the two circuits is set by the two bipolar membranes. The free lactic acid can then be taken off from the acidic circuit and the alkali solution formed can be taken off from the basic circuit. The alkali solution, as already described previously, can be recycled and added to freshly supplied wastewater for pH elevation.

Figure 8:
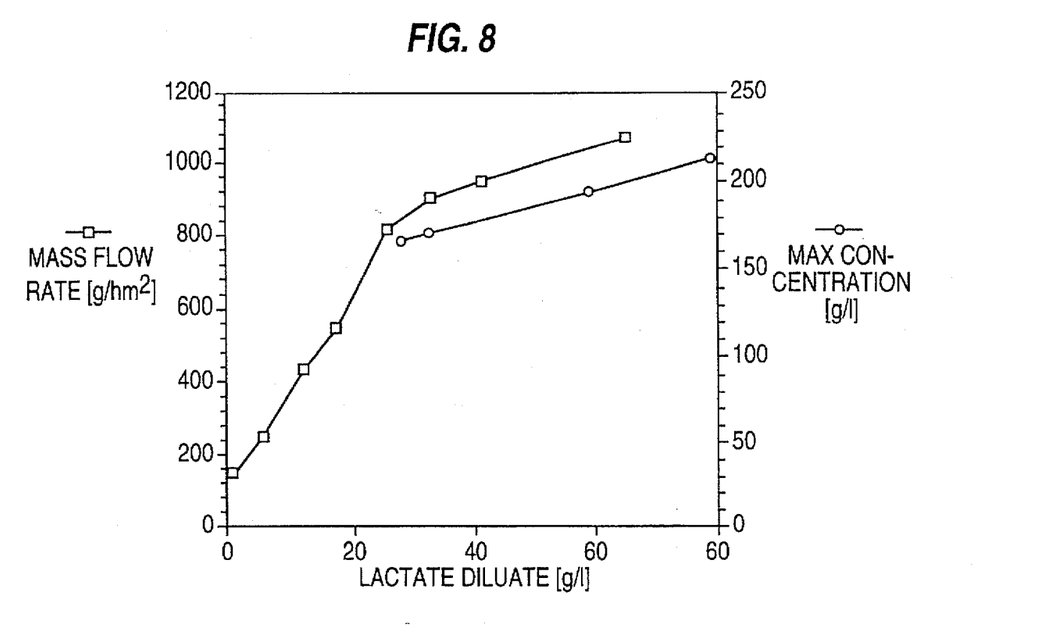
FIG. 8 shows the influence of lactic acid concentration in the wastewater on the electrodialysis performance.
Figure 9:
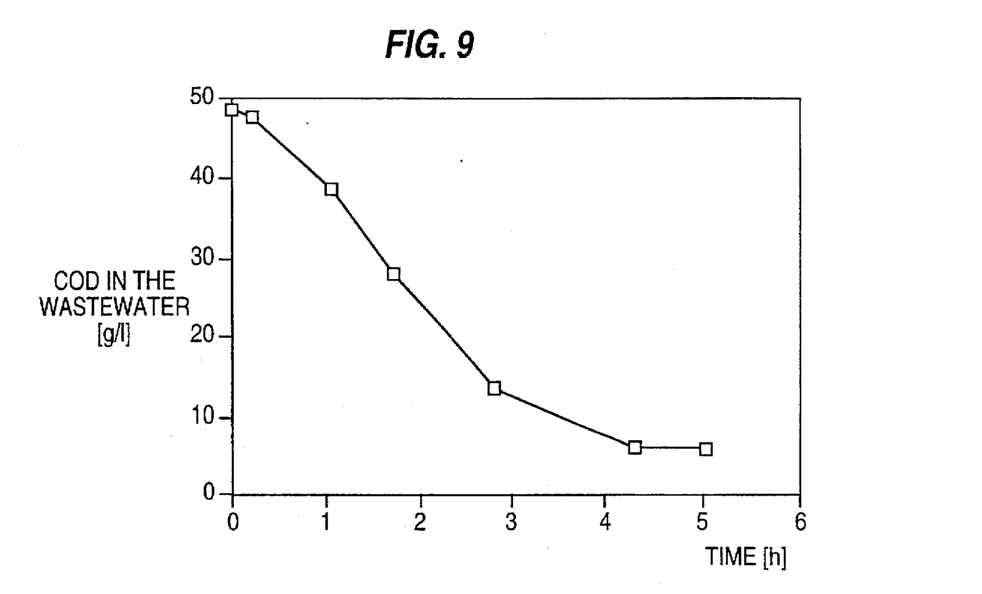
FIG. 9 shows the decrease of the COD value in the wastewater during a bipolar electrodialysis of (prepurified) fermentation broth fed batchwise.

An object of the inventions disclosed herein is to produce wastewater with minimum COD values. At the same time, it is also desirable to isolate lactic acid as pure as possible, as highly concentrated as possible, or lactate of such quality. Since, with decreasing concentrations in the diluate—that is low COD values in the wastewater—the current yields and the maximally achievable concentration of the acidic and basic products markedly decrease. Thus, it may be difficult to achieve both low COD and pure lactic acid product by simple bipolar electrodialysis with good results in each case (see FIG. 8). Accordingly, the bipolar electrodialysis may optionally be carried out as follows. The fermentation broth is reduced in concentration batchwise, that is, discontinuously, to the desired wastewater concentration. A representative COD decrease in such a case is shown in FIG.

Figure 10:
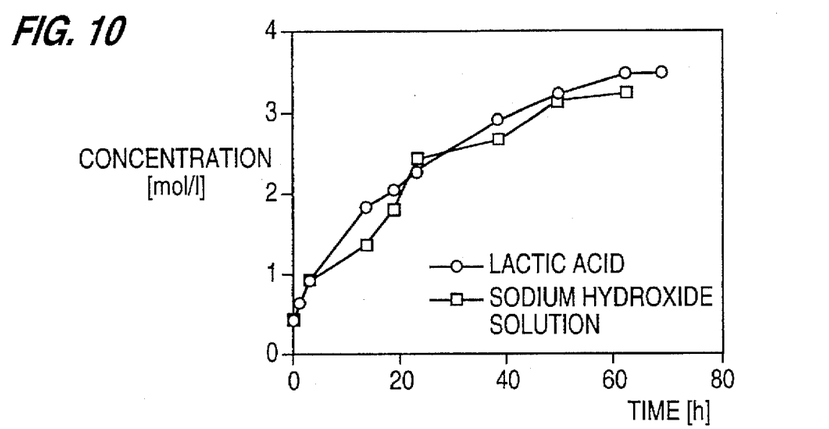
FIG. 10 shows the isolation of free lactic acid and sodium hydroxide solution by bipolar membranes.
Figure 11:
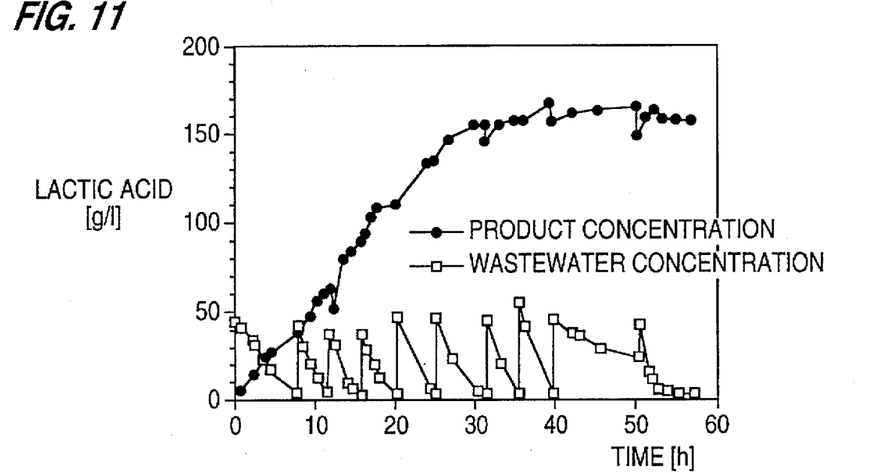
FIG. 11 shows the concentration of lactic acid (g/l) in electrodialysis for combined wastewater purification and product isolation (batchwise feed of the fermentation broth).

9. The acidic and the basic concentrates are concentrated up to the maximum product concentration (FIG. 10). During this process step, water is continuously transported through the membranes. Therefore, the product streams produced (alkali solution and lactic acid) can be taken off continuously and at constant concentration (FIG. 11). The products of this process step are therefore produced continuously. Accordingly, the alkali solution produced can be continuously returned to the wastewater during the wastewater pretreatment stage, if the pretreatment stage is likewise carried out continuously. The lactic acid produced can also be additionally purified in further continuous process steps. If a product concentration lower than the maximum is desired, the product can be diluted by water in the concentrate cycle or the concentrate may also be produced in the batch process.

The electrodialysis unit preferably includes one or more electrodialysis stacks, in which the monopolar ion-exchange membrane and the bipolar membranes are appropriately arranged. The above described, preferred electrodialysis with discontinuous sequence having a continuous production of the worked-up fermentation broth can be implemented as follows. Preferably four (4) vessels are arranged around the electrodialysis stacks. The vessels preferably include two diluate vessels, one of which is always being filled by the continuously arising feed stream and the second always being circulated by pumping via the electrodialysis module to form a diluate circuit. The diluate circuit is preferably equipped with a conductivity meter. When a defined value is undershot indicating the vessel is substantially desalted, the circuit is switched over to the second vessel, now filled. The desalted vessel is automatically emptied and then refilled with fresh feed. The procedure permits a transfer from the continuous operation to cyclic batch operation. The other two vessels preferably contain the products of lactic acid and the alkali solution. The lactic acid and alkali solutions are also circulated from the vessels by pumping via the electrodialysis stacks. A pH meter and a conductivity meter may be built into the lactic acid circuit. Preferably, only a conductivity meter is built into the alkali solution circuit. In all three circuits, the pressure is preferably measured before entry into the module.

A continuous stream can be taken off from the lactic acid and alkali vessels to concentrate these solutions. Alternately, concentration may also be carried out up to a desired concentration and then the vessels may be emptied in a cyclic batch operation at a defined residual amount. The electrodialysis unit is generally constructed in plastic or stainless steel. The unit may also be configured to permit CIP. Obviously, the number of the vessels can be higher, as those skilled in the art can readily recognize, if the plant size or a particular application requires further parallel streams.

In a particular embodiment of the present invention, during the bipolar electrodialysis, cation-exchange membranes having low transport numbers for calcium may be arranged abutting the diluate. The advantage of this embodiment is the increase in service life of the electrodialysis membrane. In this case also, the calcium-selective ion exchanger through which the fermentation broth is passed for secondary purification as described above, can be of a smaller size or even omitted. A cation-exchange membrane which is suitable for use in bipolar electrodialysis may comprise, for example, the membrane Neosepta CMS from Tokuyama Soda, which has a transport number of only 0.1 for calcium and magnesium in comparison to 0.9 for the sodium and potassium ions. The use of a cation-exchange membrane having a low transport number for calcium markedly retards and reduces the transport of calcium ions into the concentrated solution.

In another embodiment of the present invention, the electrodialysis can be carried out in two stages. The fermentation broth is subjected in a first stage to bipolar electrodialysis in which the broth is continuously reduced in concentration, to about 10 to 15 g/l diluate concentration. In a second stage, a monopolar electrodialysis is carried out in which the concentration is further decreased to the desired wastewater concentration, preferably in a batch procedure. The sodium lactate produced in the second stage can be returned to the feed stream of the first electrodialysis stage in order to increase the starting concentration of lactate there. Alternatively, the sodium lactate can be isolated as product. In another embodiment of the present invention, the second electrodialysis may also be operated as a bipolar electrodialysis, the product then being, at least in part, added back to the product streams of the first unit.

Using the present novel process, the wastewater is substantially purified. Decreasing concentrations of lactate in the diluate give rise to a corresponding decrease of the COD value in the wastewater. Thus, for example, the COD value may be decreased by 85 to 95% and free lactic acid is preferably produced at a concentration of approximately 200 g/l. The alkali solution concentration can achieve about 2 mol/l in this case.

The lactic acid produced as described above can be further purified if desired. Thus, for example, in addition to lactate concentrated in the acidic concentrate from the wastewater, other ions can be separated off by a downstream monopolar electrodialysis. According to an embodiment of the invention, a pH of about 2–3 is preferably maintained in this purification step, because the lactic acid, having a pKa of 3.9, is present in substantially complete undissociated form under these conditions.

Figure 12:
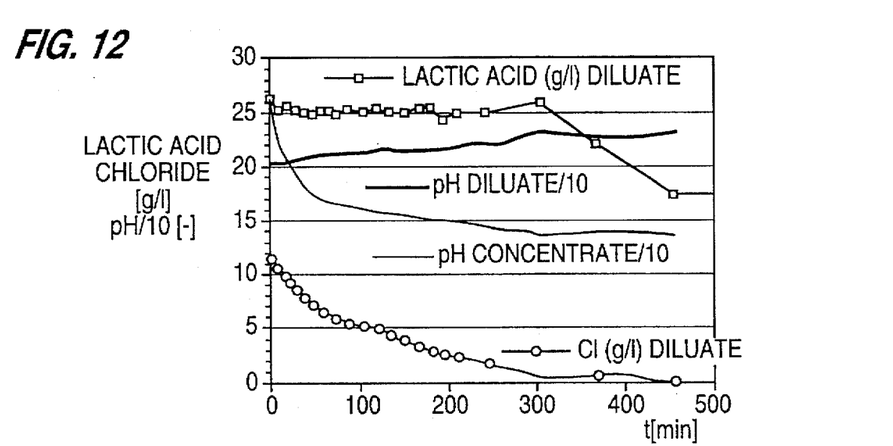
FIG. 12 shows the concentration of salt being separated off from the lactic acid by a downstream monopolar electrodialysis (with chloride-enriched fermentation solution).

In previous processes for the fermentation of whey, it was proposed to desalt the whey by electrodialysis. However, losses of the desired product lactic acid may be produced when using electrodialysis. However, by desalting using monopolar electrodialysis only after bipolar electrodialysis, the losses of lactic acid are substantially lower than if the salts are separated off prior to the fermentation (FIG. 12). A further advantage is that the salts are available to the organisms for their metabolism during fermentation, if the salts have not already been separated off prior to the fermentation stage.

The alkali solution produced can also be subjected to purification by monopolar electrodialysis.

The novel process is to be described by way of example below on the basis of a diagrammatic representation of a specific embodiment having several variations (see FIG. 1). One embodiment of the apparatus is also described in more detail in FIG. 13.

The following examples are exemplary and intended to further describe, but not limit the present invention.

EXAMPLE 1

Figure 1:
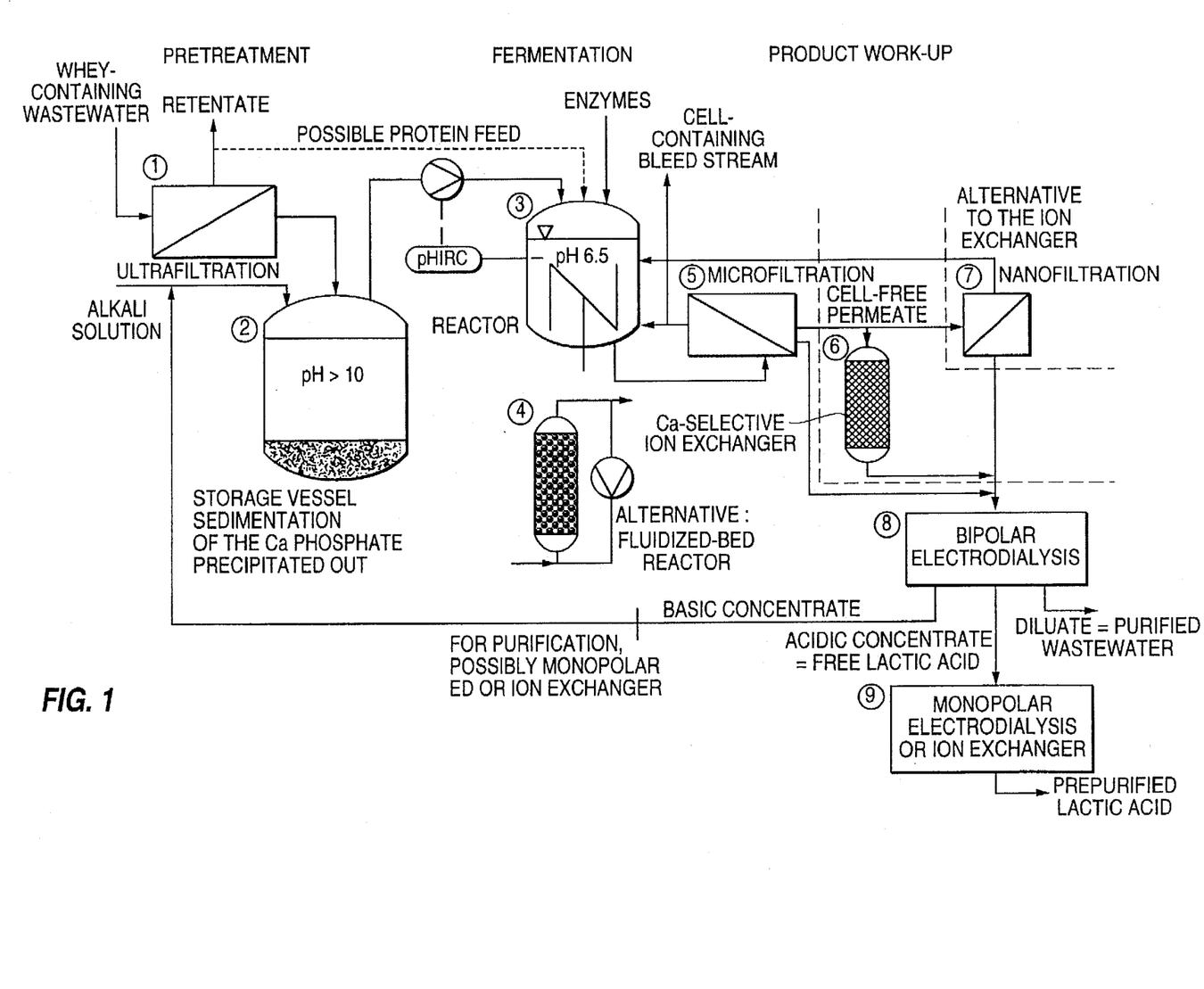
FIG. 1 is a process diagram which shows in outline an exemplary embodiment of the process according to the invention.

In the process diagram of FIG. 1, the feed of a whey-containing wastewater into an ultrafiltration unit (1) is shown. Whereas the retentate is removed, the permeate is admixed with base to pH>10 in the reservoir vessel (2) and the calcium phosphate precipitated out is sedimented.

Liquid taken off from this vessel—with adjustment of the inflow volume by a pH stat in the reactor—is fermented at a pH of 6.5 in a fermentation reactor (3) equipped with a stirrer, the addition of protein being possible. Alternatively, the fermentation can be performed in a fluidized-bed reactor (4). The fermentation broth is fed to a microfiltration unit (5), and the cell-containing bleed stream is in part returned to the fermenter (3) and in part withdrawn from the circuit. The cell-free permeate passes through either a Ca selective ion exchanger (6) or a nanofiltration unit (7), the (lactose-containing) retentate of which is again recycled to the fermenter or else directly fed to further work-up. The fermentation broth thus purified is then subjected to a bipolar electrodialysis in an electrodialysis unit (8). In this electrodialysis, the desired purified wastewater is formed as diluate and in addition an acidic concentrate is formed which contains the lactic acid and can be subjected to monopolar electrodialysis for further purification or can be passed through an ion exchanger, and a basic concentrate is formed which again can be fed to the reservoir vessel (2).

EXAMPLE 2

Figure 13:
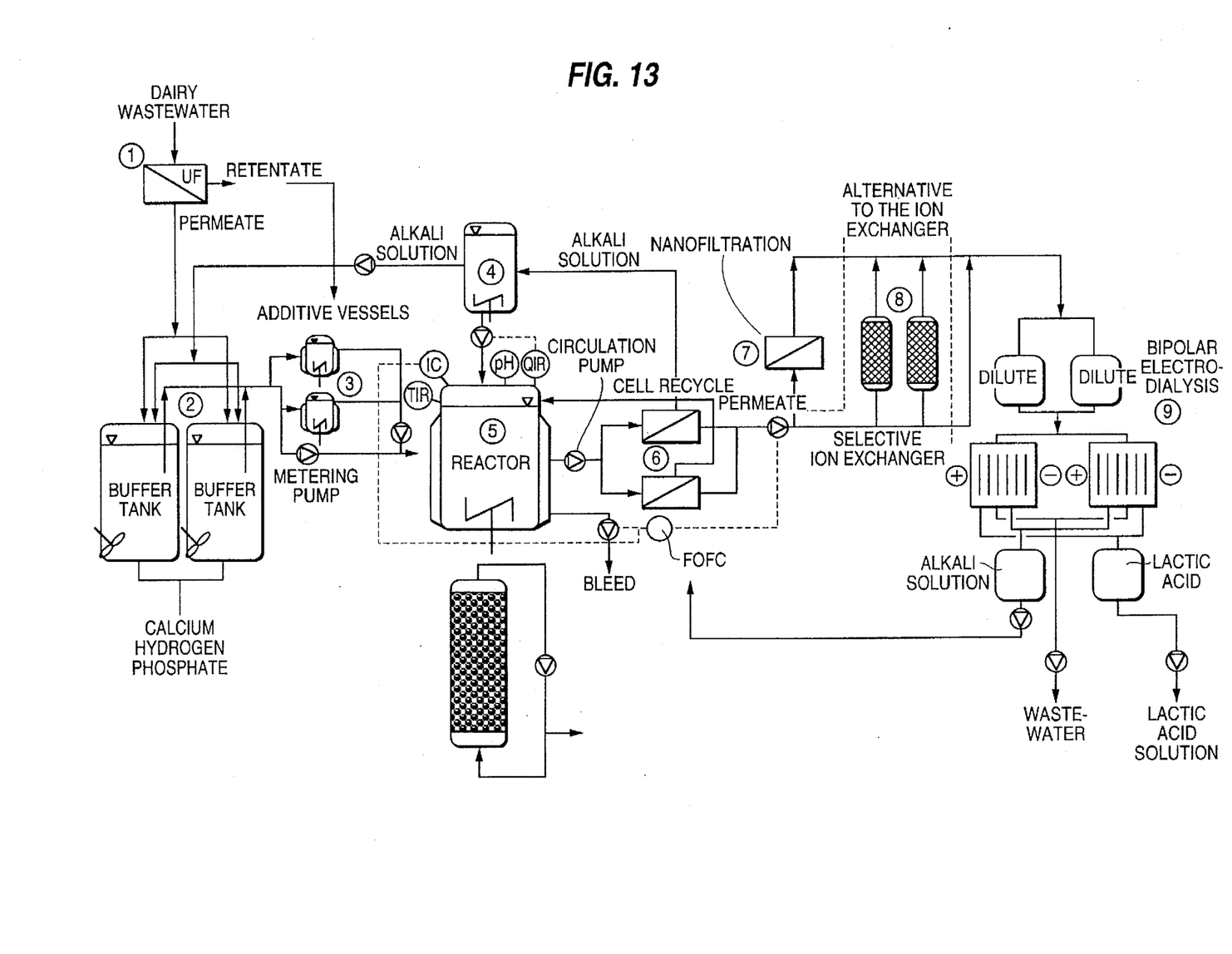
FIG. 13 shows an exemplary plant flow diagram of an apparatus for carrying out the process according to the invention.

As shown in FIG. 13, an ultrafiltration unit (1) in which the dairy wastewater is pretreated is provided. A reservoir vessel (2) here comprises two buffer tanks, into which dairy wastewater from (1) and alkali solution from a vessel (4) is introduced, having stirrers and bottom openings for the take-off of, e.g., calcium hydrogen phosphate. The additive vessel (3) which is likewise present here in duplicate can be sterilized and can preferably be heated and serves, eg., for the enzymatic hydrolysis of retentate separated off in advance or for the preparation of other additives. The appropriate additives are metered into the feed stream from the buffer tank in appropriate concentration (ratio flow controller) and conducted into the reactor (5). The alkali solution vessel (4) is made of alkali-resistant material. It is preferably, but not compulsorily, fed with alkali solution produced in the bipolar electrodialysis and topped up as required with fresh alkali solution. The alkali solution vessel (4) is provided with a level controller. Alkali solution streams are metered into the buffer tanks and into the reactor by metering pumps. The reactor (5) is depicted once as a stirred-tank reactor and below—as an alternative—as a fluidized-bed reactor. The reactor (5) has a pH stat, a level controller, a temperature measurement and control instrument and an inflow controller. A circulated stream is taken off from the stirred-tank reactor, conducted via a membrane unit and recycled to the reactor. A second stream, as a so-called bleed stream, is taken off directly downstream of the filtration unit or directly from the fermenter. This stream is established in a defined ratio to the permeate stream from the filtration unit by a ratio controller. A stream is removed from the fluidized-bed reactor at the top of the reactor and introduced below centrally into the reactor in order to fluidize the fluidized bed. A further stream is removed in order to keep the reactor volume constant. The filtration unit (6), here constructed in two lines, is fed by the circulated stream from the fermenter. The filtration unit is equipped with an apparatus for external back-flushing of the modules. The permeate of the unit (6) is set between bleed stream and permeate stream by the ratio flow controller via the coupled fermenter level controller. The permeate then passes directly via the nanofiltration unit (7) or an ion-exchange unit (8) to the electrodialysis module (9). The nanofiltration retentate can in turn be recycled to the reactor (5) or else removed. The ion-exchange unit (8) here comprises two columns through which filtration permeate can flow continuously in alternation. Downstream of the columns is a measurement instrument for measuring the loading of the exchanger and an arrangement which, when the column is full, automatically switches over to the other column. Regeneration is performed by passage, which is not depicted, of acid and alkali solution from corresponding storage vessels through the idle column. The electrodialysis (9) includes one or more electrodialysis stacks in which the monopolar ion-exchange membranes and the bipolar membranes are appropriately arranged. Two diluate vessels are alternately filled with the filtration unit (6) permeate—optionally given secondary purification—which is produced continuously, the respective other vessel being circulated by pumping (not depicted) via the electrodialysis module. The circuit is equipped with a conductivity meter. If a defined value is undershot, the circuit is switched over to the other vessel, while the first containing the liquid now reduced in concentration is automatically emptied and is then continuously filled with fresh permeate feed. The alkali solution and lactic acid produced in the electrodialysis unit are collected in two further vessels, alkali solution and lactic acid also being either circulated until a desired concentration is reached, or else can be continuously removed from the vessels. The alkali solution vessel is connected via a line to the alkali solution vessel (4), which in turn supplies the buffer vessels (2) and the reactor (5) with alkali solution.

The apparatus shown is obviously variable and is adapted as appropriate by a person skilled in the art if other embodiments of the process described above are to be implemented.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

Applicants expressly incorporate by reference the entire disclosure of each publication listed above. Applicants also incorporate by reference the entire disclosure of PCT Application No. PCT/DE95/00722.

The terms "a" and "an" as used in the following apparatus claims means at least one. Further, in the apparatus claims, when a device is said to be "connected to and capable of being in fluid communication with" another device, that phrase means that the first device is connected directly or indirectly to the second device through conduits capable of passing fluid. The connection can be an indirect connection through one or more devices intermediate the two devices.

What is claimed is:

1. A process for purifying wastewater containing lactose, comprising the steps of:
   A. treating lactose-containing wastewater with a base;
   B. anaerobically fermenting by use of microorganisms in a fermenter at least a portion of the lactose present in the treated wastewater, thereby forming a fermentation broth comprising lactic acid and base;
   C. removing at least a portion of said fermentation broth from the fermenter;
   D. purifying at least a portion of the fermentation broth removed in Step C to yield a purified broth; and
   E. concentrating at least a portion of the lactic acid and base present in the purified broth by bipolar electrodialysis to yield a lactic acid solution and an alkali solution.

2. A process as claimed in claim 1, wherein the wastewater in Step A is treated with a base selected from the group consisting of alkali metal hydroxide, alkali metal carbonate, ammonium compounds, and mixtures thereof.

3. A process as claimed in claim 2, wherein the wastewater pH is adjusted to $\geq 7$ by treatment with the base.

4. A process as claimed in claim 2, wherein the amount of base added is sufficient to precipitate out the majority of the $Ca^{2+}$ ions and $PO_4^{3-}$ ions present in the wastewater.

5. A process as claimed in claim 1, wherein treated wastewater from Step A is introduced into the fermenter in an amount or at a rate that effects a pH which is favorable for the microorganisms in the fermenter.

6. A process as claimed in claim 5, wherein said pH is from 6.0 to 6.5.

7. A process as claimed in claim 5, wherein the wastewater which has been treated with a base in Step A, has a volumetric inflow rate into the fermenter, and wherein the pH which is favorable for the microorganisms is adjusted in the fermenter by adjusting the pH of the wastewater being introduced into the fermenter, or by adjusting the volumetric inflow rate of the wastewater, or both.

8. A process as claimed in claim 1, wherein the anaerobic fermentation of Step B is carried out without addition of an external nitrogen source.

9. A process as claimed in claim 1, wherein, by addition of enzymes such as proteases into the wastewater which has been treated with a base in Step A, hydrolysis products of internal nitrogen compounds are produced which are available as a nitrogen source to the microorganisms during the fermentation.

10. A process as claimed in claim 1, wherein the fermenter is a stirred-tank reactor, and wherein, Step D comprises subjecting at least a portion of the removed broth from Step C to a separation that removes at least a portion of any cells present in the broth, and at least a portion of the cells so removed is recycled to the fermenter.

11. A process as claimed in claim 1, wherein the fermentation is carried out using microorganisms selected from the genera Lactobacillus, Lactococcus and Streptococcus.

12. A process as claimed in claim 1, wherein Step D is carried out by passing at least a portion of the removed broth from Step C through calcium-selective ion-exchange material.

13. The process as claimed in claim 1, wherein Step D is carried out by passing at least a portion of the removed broth from Step C through a nanofiltration unit.

14. The process as claimed in claim 1, wherein said bipolar electrodialysis is carried out using bipolar multiple-layer membranes, said membranes having been prepared by the steps of:

i. producing a first ion-selective polymer layer from a first solution comprising a solvent, wherein one side of the first ion-selective layer is exposed to steam such that condensation of water is avoided while simultaneously achieving a miscibility gap in the phase diagram of the polymer, the solvent and water, ii. producing on the side of the first ion-selective layer formed which had been exposed to the steam, a second ion-selective layer with opposite charge.

15. The process as claimed in claim 1, wherein the purified broth is subjected batchwise to bipolar electrodialysis in an electrodialysis unit, and at least a portion of any lactic acid and alkali solutions leaving the electrodialysis unit are continuously taken off.

16. The process as claimed in claim 1, wherein in Step E, the purified broth is reduced in concentration to a diluate concentration of not less than about 10 g/l, and then is subjected batchwise to a monopolar electrodialysis.

17. The process as claimed in claim 16, wherein at least a portion of any sodium lactate isolated in the monopolar electrodialysis is added back to the fermentation broth or to the purified broth before said purified broth is subjected to the bipolar electrodialysis.

18. The process as claimed in claim 1, wherein after Step D, the fermentation broth is subjected to first and second successive bipolar electrodialyses, each of said bipolar electrodialyses producing both a lactic acid solution and an alkali solution, and wherein at least a portion of the lactic acid solution or alkali solution, or both, produced in the second electrodialysis is admixed with the corresponding lactic acid solution or alkali solution produced in the first bipolar electrodialysis.

* * * * *